C. M. VANDERFORD.
IRRIGATING VALVE.
APPLICATION FILED MAY 29, 1916.
1,220,296.
Patented Mar. 27, 1917.
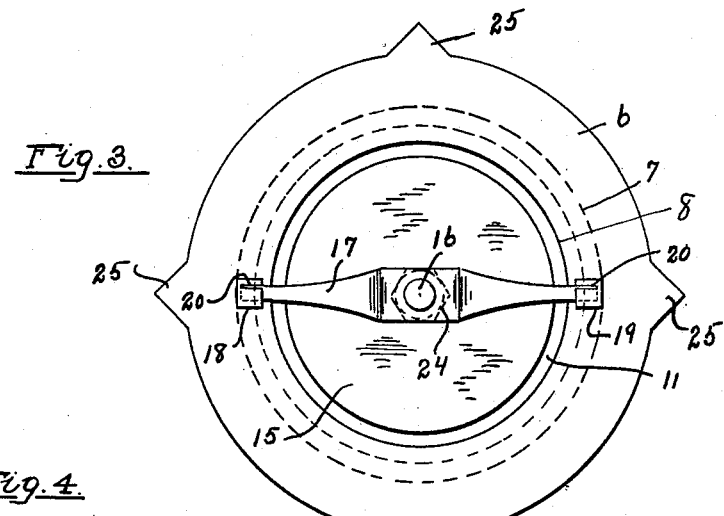
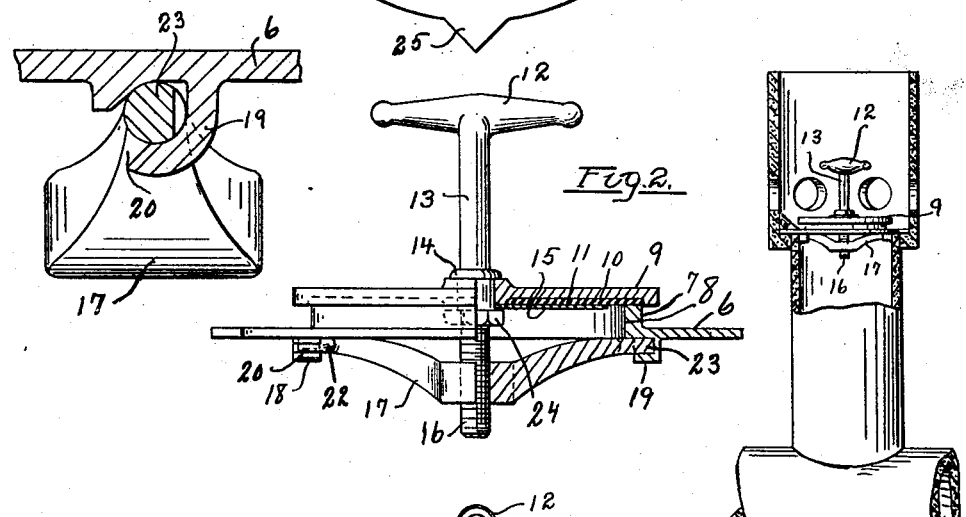
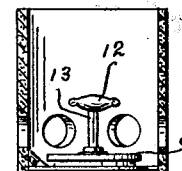
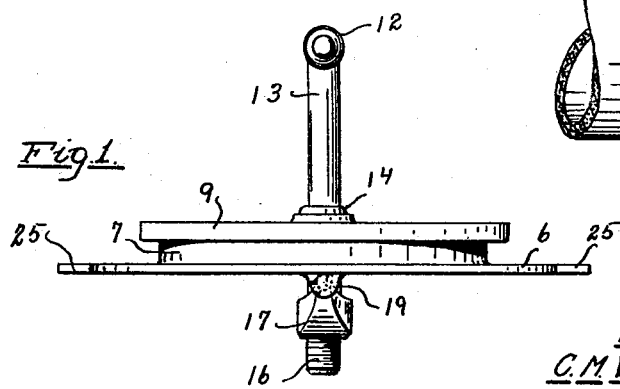
INVENTOR
C. M. VANDERFORD.
by Andrew K. Martell
ATTORNEY

UNITED STATES PATENT OFFICE.

CARY M. VANDERFORD, OF SAN FERNANDO, CALIFORNIA.

IRRIGATING-VALVE.

1,220,296. Specification of Letters Patent. Patented Mar. 27, 1917.

Application filed May 29, 1916. Serial No. 100,570.

*To all whom it may concern:*

Be it known that I, CARY M. VANDERFORD, a citizen of the United States, residing at San Fernando, in the county of Los Angeles and State of California, have invented new and useful Improvements in Irrigating-Valves, of which the following is a specification.

My invention relates primarily to a valve for use in irrigating systems in which pipes are used to convey the water underground, stand pipes being extended upwardly from the main pipe at the points where it is desired to use the water for irrigating purposes. These pipes are of the ordinary well known concrete construction commonly used for this purpose and are positioned for use in the usual manner. Each standpipe is provided at its upper end with the ordinary concrete hydrant, in which is mounted my improved valve.

The object of my invention is to provide a valve for this purpose which will be cheap and simple in construction, easy to operate, efficient in operation, and which can be easily and quickly positioned in place for use.

A further object is to provide a valve of such construction that the wearing parts can be easily and quickly repaired or replaced when necessary or desirable without detaching the valve from its place of use.

I accomplish these and other objects as will hereinafter appear by the mechanism described herein and illustrated in the accompanying drawings forming a part hereof in which:—

Figure 1 is a side elevation of my improved valve.

Fig. 2 is a side elevation of my improved valve at a right angle to Fig. 1, partly in section.

Fig. 3 is a bottom plan view of the parts shown in Fig. 2.

Fig. 4 is an enlarged sectional detail of a portion of my valve.

Fig. 5 is a view showing my valve in position for use.

My improved valve comprises an annular base or bedplate 6, having an upwardly extending rim 7, surrounding the opening 8 therein.

Resting upon the upper edge of rim 7, and normally closing opening 8, is a valve disk 9, in the underside of which is provided a recess 10. Mounted in recess 10 of disk 9, is a gasket 11, of rubber or other suitable material. Disk 9 is of such size as to overlap rim 7, and recess 10 and gasket 11 are of substantially the same size as rim 7. Revolubly mounted centrally of disk 9 is an adjusting handle 12, provided with a stem 13, and a collar 14, which collar rests upon the top of disk 9. Immediately below collar 14, and for a distance a little longer than the thickness of disk 9, stem 13 is enlarged and has mounted thereon a washer 15, which washer serves to retain gasket 11 in socket 10, and is then reduced and threaded and its lower end 16, passes centrally through a crowfoot bar 17. Depending from the underside of plate 6, adjacent to and at each side of opening 8, are bearings 18 and 19, in which are received the ends of bar 17. Bearings 18 and 19 have a portion of their side wall at one side cut away at an angle to provide narrow apertures 20, and the ends 22 and 23, of crowfoot bar 17 are cut away at one side vertically so that when bar 17 is rotated to bring said cut away portions into register with apertures 20, the ends may be withdrawn from the bearings or sockets 18 and 19.

A lock nut 24 is provided on the threaded end 16, of stem 17 to retain washer 15 in its position of use. Plate 6 is provided with radially extending ears 26, on its outer periphery for use when the valve is used with a large size pipe. When a smaller size pipe is used ears 26 are broken off.

In use my valve will be positioned within the hydrant with the outer edge of bed plate 6 resting upon and overlapping the upper end of the standpipe and the bottom of the hydrant. Cement is then placed upon the top of bed plate 6, near the edge in such manner as to form a bond with the inner surface of the lower end of the hydrant, thereby securely retaining the valve in its position of use.

While I have shown and described my valve as adapted primarily for use in irrigating systems and in its preferred form, it will be understood that I do not limit myself to such use and that various changes may be made in its construction and operation without departing from the spirit of my invention.

Having described my invention what I claim and desire to secure by Letters Patent is:—

1. An irrigating valve comprising an annular base plate having an opening therethrough; an annular valve rim surrounding said opening and extending upwardly from the base plate, said rim terminating in a valve seat; a disk valve for said valve seat adapted to close the opening through the base plate; an annular recess in the underside of said disk; a flexible gasket in said recess adapted to rest upon the valve seat; a valve stem revolubly mounted centrally of said disk valve and gasket and projecting therethrough on each side thereof, the upper end terminating in a handle and the other end being threaded; bearings depending downwardly from the underside of said base plate adjacent to and at each side of said opening having narrowed angular apertures in one of the side walls thereof; a crowfoot bar extending across the opening in the base plate on the underside thereof in which the threaded end of the valve stem is mounted and having its ends mounted in said bearings, the ends of said bar having one of their sides flattened whereby when said bar is rotated to bring said flattened portions and angular apertures into register, said ends will pass through said apertures.

2. An irrigating valve comprising an annular base plate having an opening therethrough; an annular valve rim surrounding said opening and extending upwardly from the base plate, said rim terminating in a valve seat; a disk valve for said valve seat adapted to close the opening through the base plate; an annular recess in the underside of said disk; a flexible gasket in said recess adapted to rest upon the valve seat; a valve stem revolubly mounted centrally of said disk valve and gasket and projecting therethrough on each side thereof the upper end terminating in a handle and the other end being threaded; a washer mounted on said stem beneath and adjacent to said gasket; a locknut on said stem adapted to retain said washer and gasket positioned; bearings depending downwardly from the underside of said base plate adjacent to and at each side of said opening having narrow angular apertures in one of the side walls thereof; a crowfoot bar extending across the opening in the base plate on the underside thereof in which the threaded end of the valve stem is mounted and having its ends mounted in said bearings, the ends of said bar having a cutaway portion whereby when said bar is rotated to bring the cut away portions into register with said angular apertures said ends will pass therethrough to detach said crowfoot bar from its position of use.

CARY M. VANDERFORD.

Witnesses:
EMIL MANHOF,
E. E. BEAUSEJOUR.

Copies of this patent may be obtained for five cents each, by addressing the "Commissioner of Patents, Washington, D. C."